US008077678B2

(12) United States Patent
Kim (10) Patent No.: US 8,077,678 B2
(45) Date of Patent: Dec. 13, 2011

(54) RADIO RESOURCE ALLOCATING METHOD AND APPARATUS IN ADAPTIVE ANTENNA SYSTEM

(75) Inventor: Nam-Gi Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 796 days.

(21) Appl. No.: 11/773,744

(22) Filed: Jul. 5, 2007

(65) Prior Publication Data

US 2008/0009322 A1    Jan. 10, 2008

(30) Foreign Application Priority Data

Jul. 5, 2006    (KR) .................. 10-2006-0062792

(51) Int. Cl.
*H04W 4/00* (2009.01)

(52) U.S. Cl. ..... 370/334; 370/335; 370/330; 370/395.21

(58) Field of Classification Search .................. 370/335, 370/330, 339, 395.21, 334
See application file for complete search history.

(56) References Cited

U.S. PATENT DOCUMENTS

| 6,865,393 | B1 * | 3/2005 | Baum et al. ................ 455/452.2 |
| 7,206,332 | B2 * | 4/2007 | Kwan et al. .................. 375/140 |
| 7,299,064 | B1 * | 11/2007 | Paranchych et al. .......... 455/522 |
| 7,457,641 | B1 * | 11/2008 | Legnain et al. ............ 455/562.1 |
| 7,480,278 | B2 * | 1/2009 | Pedersen et al. .............. 370/335 |
| 7,567,625 | B2 * | 7/2009 | Oh et al. ........................ 375/299 |
| 2002/0039884 | A1 * | 4/2002 | Raynes et al. ............... 455/13.3 |
| 2002/0067309 | A1 * | 6/2002 | Baker et al. ................... 342/367 |
| 2004/0063468 | A1 * | 4/2004 | Frank ............................ 455/561 |
| 2004/0252632 | A1 * | 12/2004 | Bourdoux et al. ............ 370/210 |
| 2006/0034382 | A1 * | 2/2006 | Ozluturk et al. .............. 375/267 |
| 2006/0034384 | A1 * | 2/2006 | Lee ................................ 375/267 |
| 2007/0191043 | A1 * | 8/2007 | Shapira et al. ............... 455/522 |
| 2010/0103834 | A1 * | 4/2010 | Gorokhov et al. ........... 370/252 |

FOREIGN PATENT DOCUMENTS

WO    WO 2004/075569    9/2004

* cited by examiner

*Primary Examiner* — Kent Chang
*Assistant Examiner* — Ronald Eisner
(74) *Attorney, Agent, or Firm* — The Farrell Law Firm, P.C.

(57) ABSTRACT

A radio resource allocating method in an adaptive antenna system is provided. The radio resource allocating method includes selecting one user when there are one or more users allocable to a current spatial frame; calculating a sum of Modulation order Product code Rate (MPR) values with respect to users allocated a same radio resource including the selected user when a total transmit power of a Base Station (BS) is divided by a current spatial frame index; and allocating the selected user to the current spatial frame by taking into account the calculated sum and a sum of MPR values with respect to users allocated to a previous spatial frame. Accordingly, a system throughput or a scheduler performance can be maximized.

16 Claims, 8 Drawing Sheets

RADIO RESOURCE ALLOCATING METHOD AND APPARATUS IN ADAPTIVE ANTENNA SYSTEM

PRIORITY

This application claims priority under 35 U.S.C. §119(a) to an application filed in the Korean Intellectual Property Office on Jul. 5, 2006 and assigned Serial No. 2006-62792, the contents of which are incorporated herein by reference.

BACKGROUND OF THE INVENTION

1. Field of the Invention

The present invention relates generally to an adaptive antenna system and in particular, to an efficient radio resource allocating method and apparatus for improving a system throughput with respect to a scheduled user.

2. Description of the Related Art

The Institute of Electrical Electronics Engineers (IEEE) 802.16 wireless Metropolitan Area Network (MAN) standard is standardized to use a Space Division Multiple Access (SDMA) scheme in an adaptive antenna system. The SDMA scheme allocates a radio resource positioned in the same frequency and at the same time point to a plurality of Mobile Stations (MSs) simultaneously using a directional antenna capable of forming a beam. The SDMA scheme is a radio communication technology that can drastically increase the system capacity when there are multiple MSs.

Figure 1:
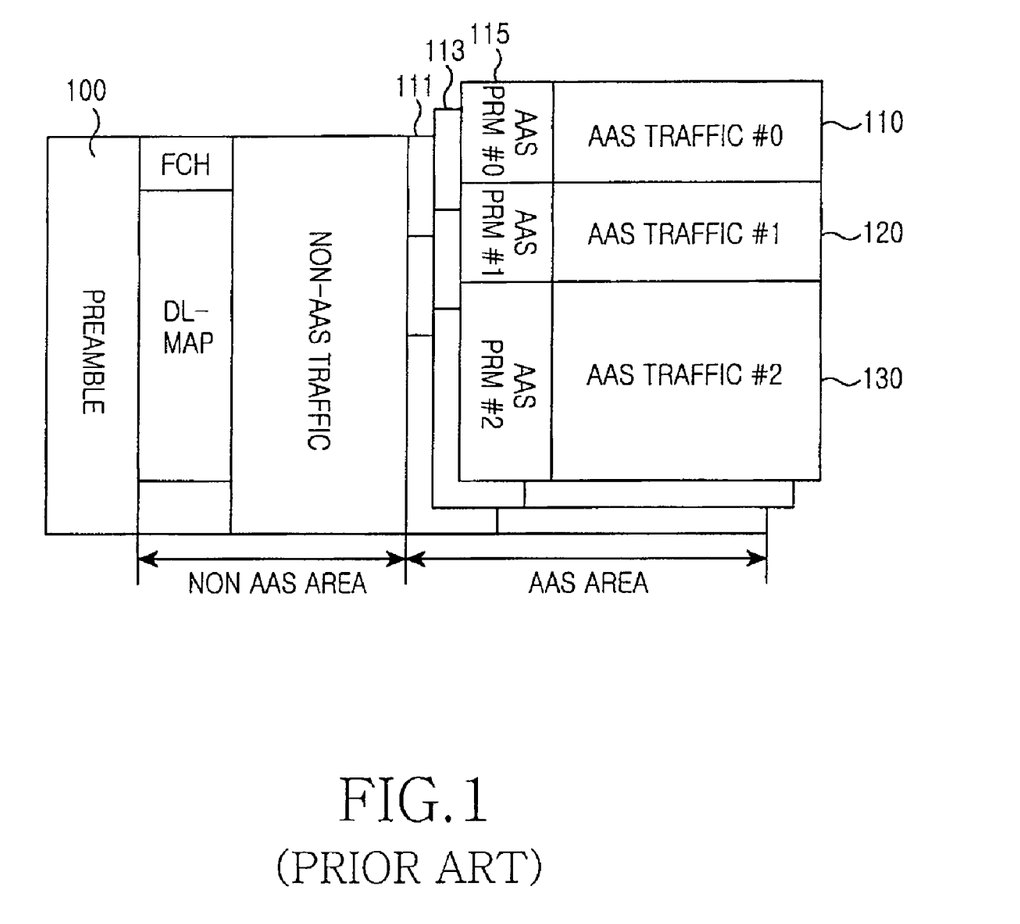
FIG. 1 illustrates a DL frame structure in a general adaptive antenna system.

FIG. 1 is a diagram of a Downlink (DL) frame structure in a general Adaptive Antenna System (AAS). The DL frame of FIG. 1 includes a preamble 100, a non-AAS area, and an AAS area. The AAS area enables the SDMA with respect to the radio resource. Hence, a radio resource corresponding to AAS traffic #0 110 can be allocated to a plurality of MSs 111, 113 and 115 at the same time. Radio resources corresponding to AAS traffic #1 120 and AAS traffic #2 130 can be allocated to the plurality of MSs at the same time.

As such, when the SDMA scheme is adopted in the adaptive antenna system, a Base Station (BS) can overlappingly allocate the radio resource positioned in the same frequency and at the same time point to one or more MSs. In this case in the beam formation correlation may occur between the MSs assigned the overlapping radio resources. The correlation may make it difficult for the MSs to successively extract their received signal. To prevent this, the BS selectively allocates the radio resources of the same position to MSs that suffer less correlation, using a scheduling algorithm so as to maintain the independence between the radio spatial resources.

In the meantime, an amount of data carried by the allocated spatial resource is determined by a user channel quality and a transmit power allocated to the spatial resource. The user channel quality varies according to time and space whereas the transmit power is fixed by the system. Hence, users using the radio resource at the same position need to properly divide and utilize the fixed transmit power. In doing so, when the user is allocated more transmit power, the channel receive sensitivity of the corresponding user increases and more data is delivered by the allocated resource. By contrast, when the user is allocated less transmit power, the channel receive sensitivity of the corresponding user decreases and less data is delivered by the same resource.

Figure 2:
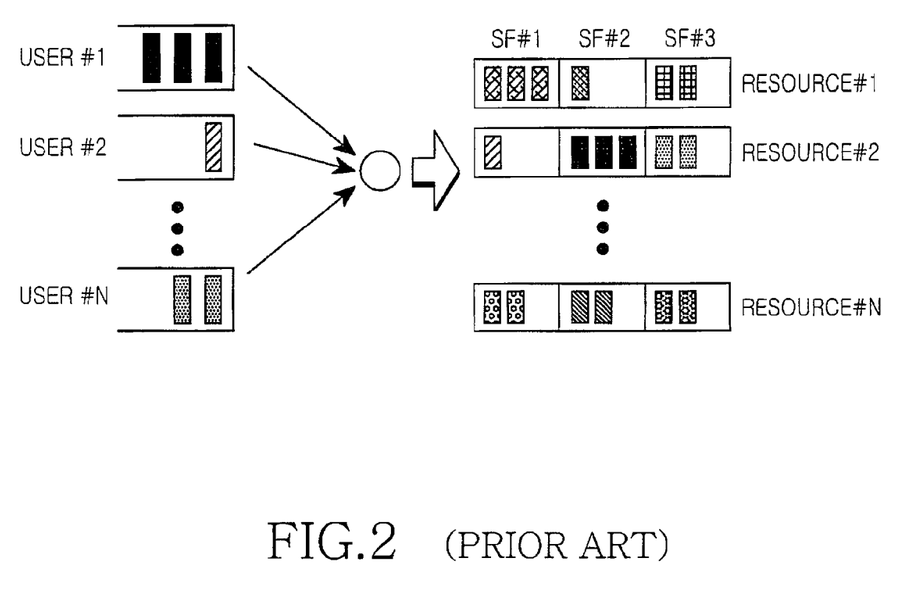
FIG. 2 illustrates a scheduling and resource allocating method of the general adaptive antenna system.

FIG. 2 is a diagram of a scheduling and resource allocating method in the general adaptive antenna system. Typically, a scheduler sequentially allocates radio resources according to priority of users using user information stored to a queue management module. Specifically, the scheduler allocates spatial resources for Spatial Frames (SFs) #1, #2, and #3 corresponding to a radio resource Resource #1 by taking into account the scheduling priority and the correlation between the users. Upon completing the allocation, a radio resource for a Resource #2 is allocated in the same manner and the allocation is repeated up to a Resource #N.

The conventional scheduler allocates the radio spatial resources to maximize the system throughput merely by taking into account a Modulation order Product code Rate (MPR), without considering the user channel quality and the allocated power. FIG. 3 illustrates drawbacks of the conventional scheduling and resource allocating method. Table 1 is a Carrier to Interference and Noise Ratio (CINR) and MPR table used in the example of FIG. 3. The MPR is a ratio of a transmittable information amount using the radio resource of the same size. The MPR is classified into a plurality of levels. Each level corresponds to a CINR value and determines a Modulation and Coding Scheme (MCS) level according to the MPR level.

TABLE 1

| CINR (dB) | MPR | MCS level |
|---|---|---|
| 2 | 0.17 | QPSK ½ repetition 6 |
| 3 | 0.25 | QPSK ½ repetition 4 |
| 5 | 0.5 | QPSK ½ repetition 2 |
| 8 | 1.0 | QPSK ½ repetition 1 |
| 11 | 1.5 | QPSK ⅔ |
| 14 | 2.0 | 16QAM ½ |
| 17 | 3.0 | 16QAM ¾ |
| 20 | 4.0 | 16QAM ⅔ |
| 24 | 5.0 | 64QAM ⅚ |

Figure 3A:
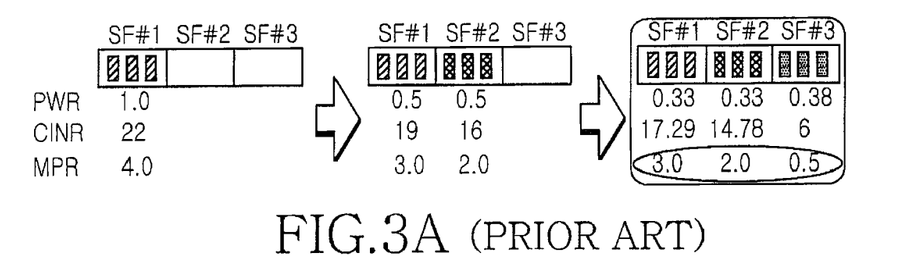
FIG. 3 illustrates drawbacks of the conventional scheduling and resource allocating method.
Figure 3B:
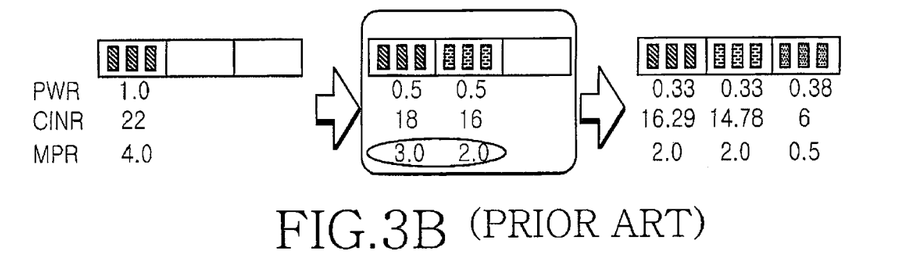
Figure 3C:
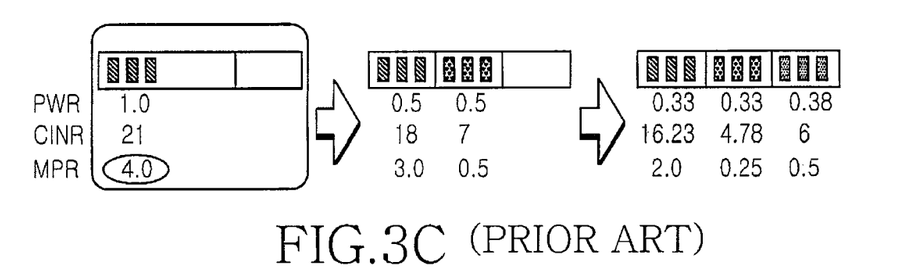

In FIG. 3a, when the allocation up on SF #3 is finished, the sum of MPR values is 5.5 (=3.0±2.0±0.5). Hence, when all of SF #1, #2 and #3 are allocated, the system throughput is most excellent. However, in a case of the allocation up to SF #2 in FIG. 3b, the sum of MPR values is 5.0, which is better than the sum 4.5 (=2.0±2.0±0.5) of MPR values in the allocation up to SF #3. In this case, the system throughput becomes better when the spatial resources are allocated to only two users, rather than three users. In FIG. 3c, when only SF #1 is allocated; that is, when the spatial resource is allocated to a sole user, MPR 4.0 exhibits the best system throughput. In other words, when the scheduler allocates the radio spatial resources by taking into account the MPR alone, without considering the user channel quality and the allocated power, the spatial resources are allocated to the sole user. As a result, the radio spatial resource utilization may deteriorate.

Therefore, what is needed is a radio resource allocating method for maximizing the system throughput by taking into account the user channel quality and the allocated power.

SUMMARY OF THE INVENTION

An aspect of the present invention is to substantially solve at least the above problems and/or disadvantages and to provide at least the advantages below. Accordingly, an aspect of the present invention is to provide a radio resource allocating method and an apparatus of an adaptive antenna system.

Another aspect of the present invention is to provide a radio resource allocating method and an apparatus for maximizing a system throughput by talking into account a user channel quality and an allocated power in an adaptive antenna system.

A further aspect of the present invention is to provide a method and an apparatus for allocating radio resource in the same position to users to maximize a system throughput or a scheduler performance in an adaptive antenna system.

The above aspects are achieved by providing a radio resource allocating method in an adaptive antenna system, which includes selecting one user when there are one or more users allocable to a current spatial frame, calculating a sum of MPR values with respect to users allocated the same radio resource including the selected user when a total transmit power of a Base Station (BS) is divided by a current spatial frame index; and allocating the selected user to the current spatial frame by taking into account the calculated sum and a sum of MPR values with respect to users allocated to a previous spatial frame.

According to one aspect of the present invention, a radio resource allocating method in an adaptive antenna system includes selecting one user when there are one or more users allocable to a current spatial frame; when different transmit powers are given for respective users, calculating a sum of MPR values with respect to users allocated the same radio resource including the selected user, and calculating a transmit power set corresponding to a largest value; and allocating the selected user to the current spatial frame by taking into account a calculated sum of the MPR values with respect to the transmit power set and a sum of MPR values with respect to users assigned to a previous spatial frame.

According to another aspect of the present invention, a radio resource allocating method in an adaptive antenna system includes selecting one user when there are one or more users allocable to a current spatial frame; calculating a sum of scheduling weight values with respect to users allocated the same radio resource including the selected user when a total transmit power of the BS is divided by a current spatial frame index; and allocating the selected user to the current spatial frame by taking into account the calculated sum and a sum of scheduling weight values with respect to users allocated to a previous spatial frame.

According to a further aspect of the present invention, a radio resource allocating method in an adaptive antenna system includes selecting one user when there are one or more users allocable to a current spatial frame; when different transmit powers are given for respective users, calculating a sum of scheduling weight values with respect to users allocated the same radio resource including the selected user, and calculating a transmit power set corresponding to a largest value; and allocating the selected user to the current spatial frame by taking into account the calculated scheduling weight sum with respect to the calculated transmit power set and a sum of scheduling weight values with respect to users allocated to a previous spatial frame.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constrictions are not described in detail since they would obscure the invention in unnecessary detail.

The present invention provides a radio resource allocating apparatus and method of an adaptive antenna system.

Figure 4:
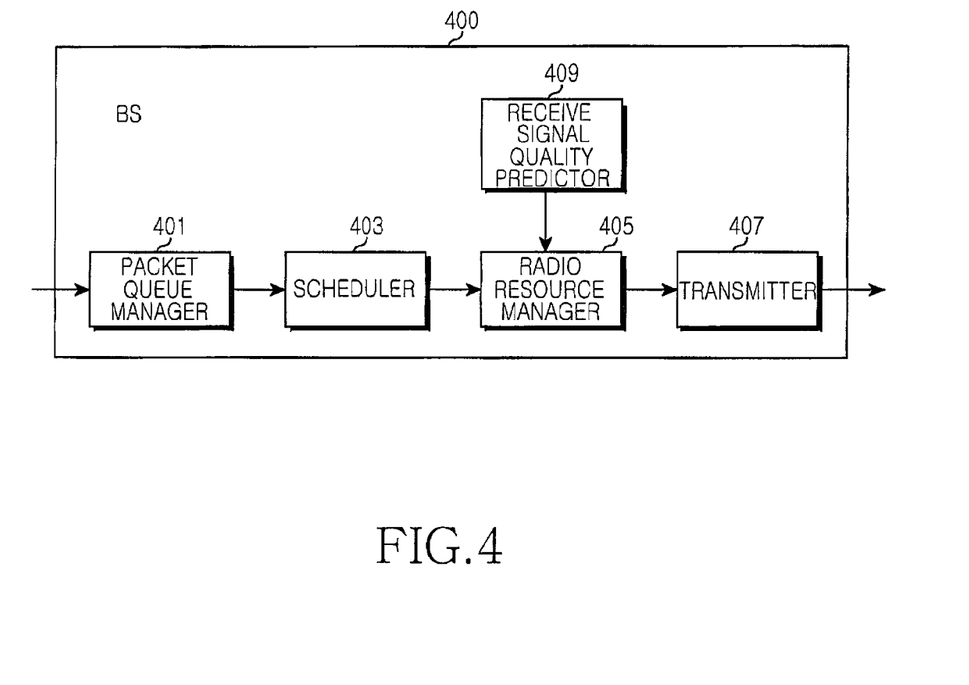
FIG. 4 illustrates a Base Station (BS) structure in an adaptive antenna system according to the present invention.

FIG. 4 illustrates a Base Station (BS) structure in an adaptive antenna system according to the present invention. The BS 400 includes a packet queue manager 401, a scheduler 403, a radio resource manager 405, a transmitter 407, and a receive signal quality predictor 409.

In the BS 400 of FIG. 4 the packet queue manager 401 stores DownLink (DL) data to be sent to Mobile Stations (MSs) and provides the stored DL data to the scheduler 403. The packet queue manager 401 can include as many buffers as a number of MSs connected to the packet queue manager 401. The buffers store packets to be sent to the respective MSs.

The scheduler 403 determines a packet transmission priority of data to be allocated in a corresponding flame using the DL data received from the packet queue manager 401 and service allocation information of users. Also, the scheduler 403 determines and schedules scheduler sets, which include MSs to be allocated in the corresponding frames according to the determined priority and an allocation data amount of the MSs. In addition to the general functions, the scheduler 403 allocates radio resources to MSs by taking into account a user channel quality and an allocated power according to the radio resource allocating method of the present invention.

The radio resource manager 405 allots the scheduled MSs to real physical radio resources according to the priority determined by the scheduler 403. When the radio resources are allocated to the MSs, the radio resource manager 405 calculates a transmit power required for each MS to maintain a corresponding receive CNR using a receive CINR of each MS which is input from the receive signal quality predictor 409, and compensates for the calculated transmit power.

The transmitter 407 loads MS data to the radio resource with the compensated transmit power and transmits the data to the corresponding MS. The receive signal quality predictor 409 estimates the receive CINR of each MS, which is received over a CQI channel, and provides the estimated receive CINR of each MS to the radio resource manager 405.

FIGS. 5 through 8 illustrate radio resource allocating methods of BSs in the adaptive antenna system according to embodiments of the present invention. The radio resource allocating method of the present invention is divided to a fixed power allocation scheme and a variable power allocation scheme based on a power allocation, and divided to a Max Modulation order Product code Rate (MPR) scheme for maximizing a system throughput and a MaxWeight scheme for maximizing a scheduler performance based on a performance measurement. Herein the fixed power allocation scheme allocates a same transmit power to corresponding users by uniformly dividing a power resource by a number of the corresponding users when one or more users utilize a same radio resource. The variable power allocation scheme variously allocates the transmit power to each user. The MaxMPR scheme selects a user to primarily maximize a total system throughput that can be provided by a current system. The MaxWeight scheme enhances user service quality by selecting a user to maximize a weight of a system-scheduling algorithm.

Figure 5:
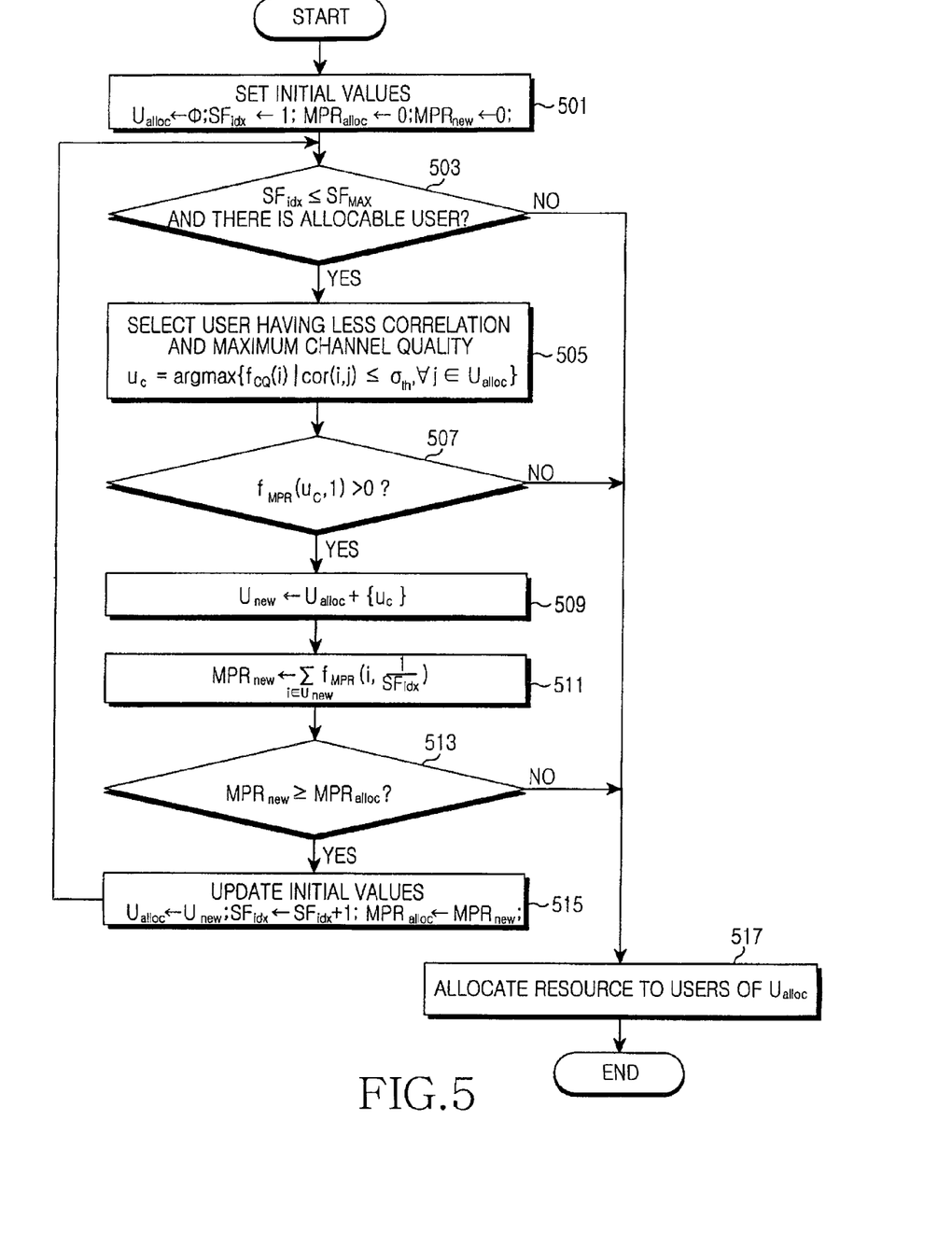
FIG. 5 illustrates a radio resource allocating method of a fixed power allocation Max (Modulation order Product code Rate) MPR scheme of a BS in an adaptive antenna system according to a first embodiment of the present invention.

FIG. 5 illustrates a radio resource allocating method of a fixed power allocation MaxMPR scheme of a BS in an adaptive antenna system according to a first embodiment of the present invention.

The BS in FIG. 5 sets initial values of resource allocation parameters as expressed in Equation (1) in step 501.

$$U_{alloc} \leftarrow \phi; SF_{idx} \leftarrow 1; MPR_{alloc} \leftarrow 0; MPR_{new} \leftarrow 0; \quad (1)$$

In Equation (1), $U_{alloc}$ denotes a pre-allocated user set and its initial value is set to $\phi$. $SF_{idx}$ denotes a spatial frame index to be allocated currently and its initial value is set to 1. $MPR_{alloc}$ denotes a sum of MPR values for users included in $U_{alloc}$ when a power weight is $P=1/SF_{idx}$, and $MPR_{new}$ denotes a sum of MPR values for users included in $U_{new}$. An initial value of $MPR_{alloc}$ and $MPR_{new}$ is set to zero.

Next, the BS checks whether $SF_{idx} \leq SF_{MAX}$ and whether there is a user allocable to the current $SF_{idx}$ in step 503. $SF_{MAX}$ denotes a maximum number of allocable spatial frames. When $SF_{idx} > SF_{MAX}$ or there is no user allocable to the current $SF_{idx}$, the BS allocates resources to users of $U_{alloc}$ in step 517 and terminates this process. By contrast, when $SF_{idx} \leq SF_{MAX}$ and there is a user allocable to the current $SF_{idx}$, the BS selects users having a correlation less than or equal to a threshold with respect to all users of $U_{alloc}$ among users not assigned resources, and selects a user having a maximum channel quality from among the selected users in step 505.

The user $u_c$ having a lowest correlation and a maximum channel quality can be selected based on Equation (2).

$$u_c = \arg\max\{f_{CQ}(i) \text{cor}(i,j) \leq \sigma_{th}, \forall j \in U_{alloc}\} \quad (2)$$

In Equation (2), j denotes a user in $U_{alloc}$, cor(i,j) denotes a correlation between users i and j, and $\sigma_{th}$ denotes a threshold of the correlation. The function $f_{CQ}(i)$ denotes a function which quantizes and represents a channel quality of the user i.

Next, the BS checks whether an MPR value of the selected user $u_c$ is greater than zero when the power weight is P=1 in step 507. This is to allocate resources only to users of a good channel condition by examining the channel condition of the selected user. Although the user of the maximum channel quality is selected in step 505, if the channel condition of the selected user is not sufficiently good, the BS can enhance the system throughput by not selecting a user to be allocated the resource any more. When the MPR value of the selected user $u_c$ is less than or equal to zero, the BS does not include users in $U_{alloc}$ any more and allocates resources to the users of $U_{alloc}$ in step 517. By contrast when the MPR value of the selected user $u_c$ is greater than zero, the BS stores the user set including the user $u_c$ in $U_{alloc}$ to a temporary user set $U_{new}$ in step 509.

In step 511, the BS calculates a sum of MPR values with respect to every user i of the temporary user set $U_{new}$ when the power weight is $P=1/SF_{idx}$, and updates $MPR_{new}$ to the calculated value.

$MPR_{new}$ is updated based on Equation (3).

$$MPR_{new} \leftarrow \sum_{i \in U_{new}} f_{MPR}\left(i, \frac{1}{SF_{idx}}\right) \quad (3)$$

Next, the BS checks whether $MPR_{new}$ is greater than or equal to $MPR_{alloc}$ in step 513. That is, the BS checks whether the resource allocation to the user $u_c$ increases the total $MPR_{new}$ of every user allocated the resource. When $MPR_{alloc}$ is less than $MPR_{alloc}$ the BS determines that the resource allocation to the user $u_c$ leads to a degradation of the system throughput and allocates resources to the users of $U_{alloc}$ excluding the user $u_c$ in step 517. By contrast, when $MPR_{new}$ is greater than or equal to $MPR_{alloc}$, the BS includes the user $u_c$ in the resource allocation user set $U_{alloc}$ by updating the initial value based on Equation (4) in step 515, and returns to step 503 to perform the subsequent steps in relation to the next $SF_{idx}$.

$$U_{alloc} \leftarrow U_{new}; SF_{idx} \leftarrow SF_{idx}+1; MPR_{alloc} \leftarrow MPR_{new}; \quad (4)$$

Figure 6:
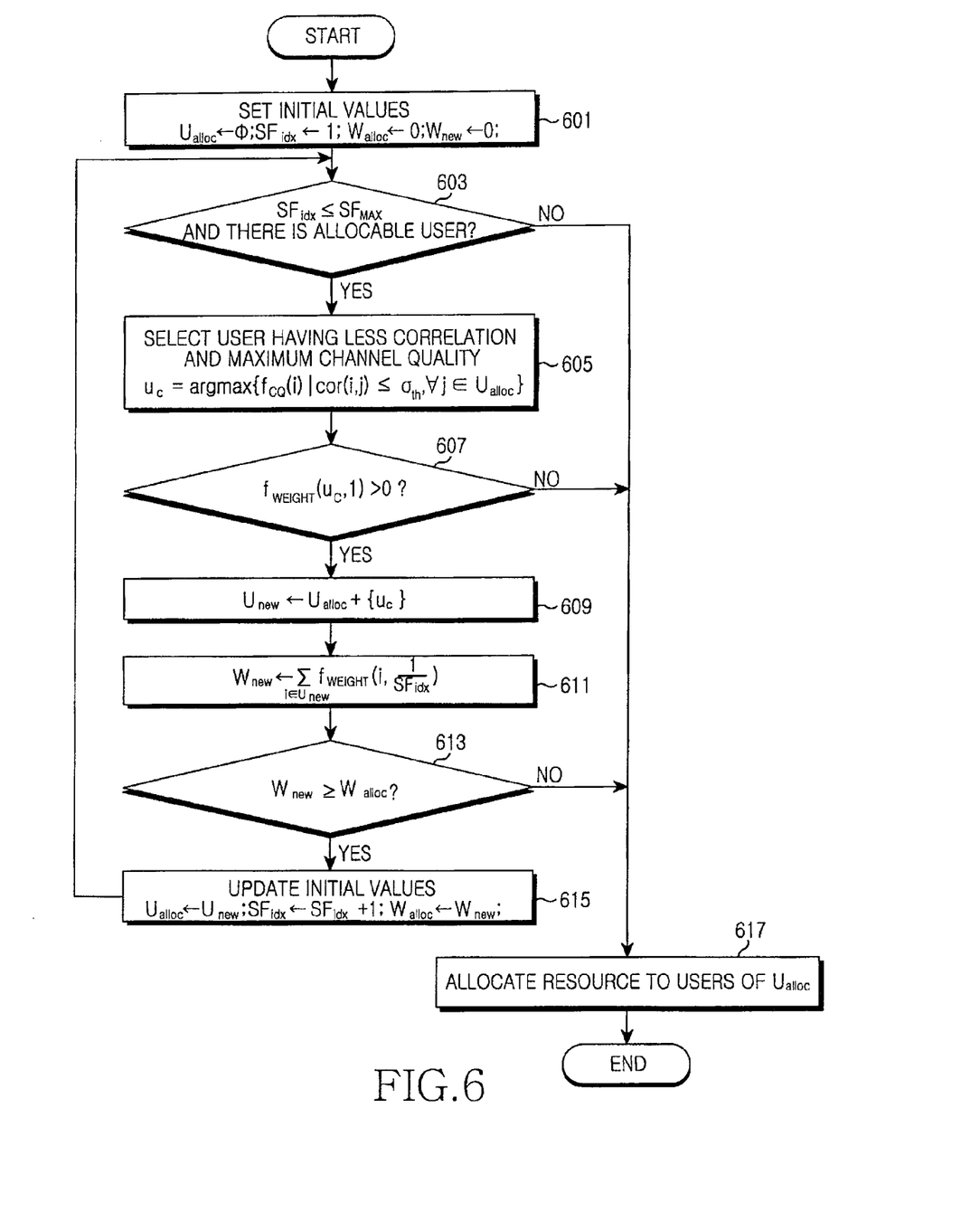
FIG. 6 illustrates a radio resource allocating method of a fixed power allocation MaxWeight scheme of BS in an adaptive antenna system according to a second embodiment of the present invention.

FIG. 6 illustrates a radio resource allocating method of a fixed power allocation MaxWeight scheme of a BS in an adaptive antenna system according to a second embodiment of the present invention.

The BS in FIG. 6 sets initial values of resource allocation parameters based on Equation (5) in step 601.

$$U_{alloc} \leftarrow \phi; SF_{idx} \leftarrow 1; W_{alloc} \leftarrow 0; W_{new} \leftarrow 0; \quad (5)$$

In Equation (5). $U_{alloc}$ denotes a pre-allocated user set and its initial value is set to $\phi$. $SF_{idx}$ denotes a spatial frame index to be allocated currently and its initial value is set to 1. $W_{alloc}$ denotes a sum of scheduling weight values with respect to users in $U_{alloc}$ when the power weight is $P=1/SF_{idx}$. $W_{new}$ denotes a sum of scheduling weight values with respect to users in $U_{new}$ and their initial value is set to zero.

Next, the BS checks whether $SF_{idx} \leq SF_{MAX}$ and whether there is a user allocable to the current $SF_{idx}$ in step 603. $SF_{MAX}$ denotes a maximum number of allocable spatial frames. When $SF_{idx} > SF_{MAX}$ or there is no user-allocable to the current $SF_{idx}$, the BS allocates resources to users of $U_{alloc}$ in step 617 and then terminates this process. By contrast, when $SF_{idx} \leq SF_{MAX}$ and there is a user allocable to the current $SF_{idx}$, the BS selects users having a correlation less than or equal to a threshold with respect to every user in $U_{alloc}$, among the users not allocated resources, and selects a user having a maximum channel quality in step 605. The user $u_c$ having a lowest correlation and the maximum channel quality can be selected based on Equation (2).

In step 607, the BS checks whether a scheduling weight value for the selected user $u_c$ is greater than zero when the power weight is P=1. Herein, the scheduling algorithm can employ a proportional fairness process. In this case, the scheduling weight value can be expressed as Equation (6).

$$\frac{\text{data amount transmittable by current user in channel}}{\text{service amount provided from system over certain time period}} \quad (6)$$

This is to allocate resources only to users of the good channel condition by examining the channel condition of the selected user. In more detail, although the user having the maximum channel quality is selected in step 605, when the channel condition of the selected user is poor, the BS can improve the system throughput by not selecting a user to be allocated the resource any more. When the scheduling weight value of the selected user $u_c$ is less than or equal to zero, the BS does not include users in $U_{alloc}$ any more and allocates resources to the users of $U_{alloc}$ in step 617. By contrast, when the scheduling weight value of the selected user $u_c$ is greater than zero, the BS stores a user set including the user $u_c$ in $U_{alloc}$ to a temporary user set $U_{new}$ in step 609.

In step 611, the BS calculates a sum of scheduling weight values with respect to every user i in the temporary user set $U_{alloc}$ when the power weight is $P=1/SF_{idx}$, and updates $W_{new}$ using the calculated value.

$W_{new}$ is updated based on Equation (7).

$$W_{new} \leftarrow \sum_{i \in U_{new}} f_{WEIGHT}\left(i, \frac{1}{SF_{idx}}\right) \quad (7)$$

Next, the BS checks whether $W_{new} \geq W_{alloc}$ in step 613. That is, the BS checks whether the resource allocation to the user $u_c$ increases the total scheduling weight values of all of the users assigned the resource. When $W_{new} < W_{alloc}$, the BS determines that the resource allocation to the user $u_c$ degrades the system throughput, and thus allocates resources to the users of $U_{alloc}$ excluding the user $u_c$ in step 617. When $W_{new} \geq W_{alloc}$, the BS includes the user $u_c$ to the resource allocation user set $U_{alloc}$ by updating the initial values based on Equation (8) in step 615, and returns to step 603 to perform the subsequent steps with respect to the next $SF_{idx}$.

$$U_{alloc} \leftarrow U_{new}; SF_{idx} \leftarrow SF_{idx}+1; W_{alloc} \leftarrow W_{new}; \quad (8)$$

Figure 7:
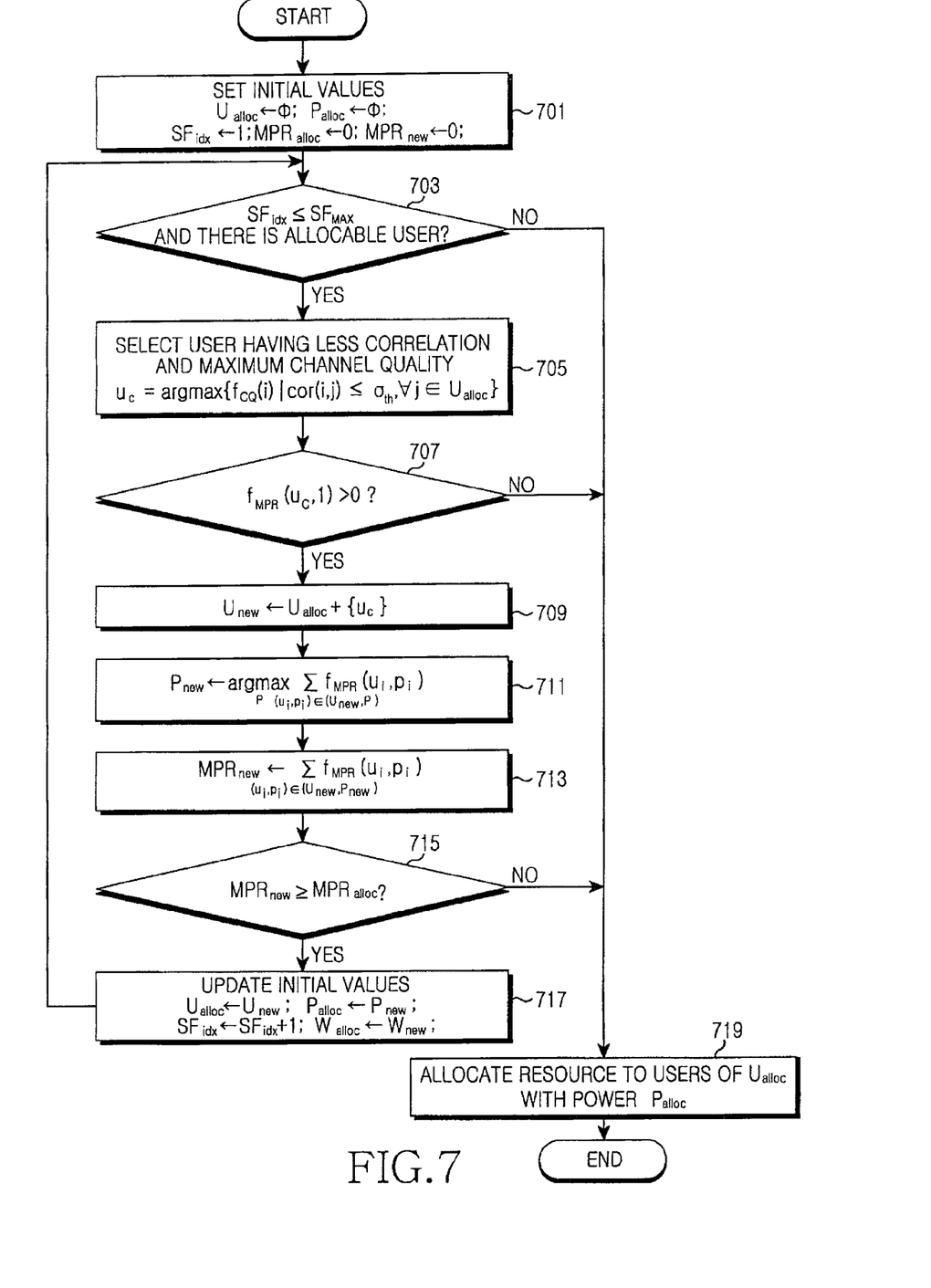
FIG. 7 illustrates a radio resource allocating method of a variable power allocation MaxMPR scheme of a BS in an adaptive antenna system according to a third embodiment of the present invention.

FIG. 7 illustrates a radio resource allocating method of a variable power allocation MaxMPR scheme of a BS in an adaptive antenna system according to a third embodiment of the present invention The BS in FIG. 7 sets initial values of resource allocation parameters based on Equation (9) in step 701.

$$U_{alloc} \leftarrow \phi; P_{alloc} \leftarrow \phi; SF_{idx} \leftarrow 1; MPR_{alloc} \leftarrow 0;$$
$$MPR_{new} \leftarrow 0; \quad (9)$$

In Equation (9), $U_{alloc}$ denotes a pre-allocated user set, and $P_{alloc}$ donates a transmit power set of users who maximize MPR when the user set is $U_{alloc}$. Their initial value is set to $\phi$. $SF_{idx}$ denotes a spatial frame index to be allocated currently, and its initial value is set to 1. $MPR_{alloc}$ denotes a sum of MPR values with respect to all users in $U_{alloc}$ when the power weight is $P=p_i$, and $MPR_{new}$ denotes a sum of MPR values with respect to all users in $U_{new}$. Their initial value is set to zero.

The element $p_i$ belonging to the set $P_{alloc}$ should satisfy constraints expressed as Equation (10).

$$0 \leq p_i \leq 1 \text{ and } \sum_{p_i \in P_{alloc}} p_i \leq 1 \quad (10)$$

Next, in step 703, the BS checks whether $SF_{idx} \leq SF_{MAX}$ and whether there is a user allocable to the current $SF_{idx}$. $SF_{MAX}$ denotes a maximum number of allocable spatial frames. When $SF_{idx} > SF_{MAX}$ or there is no user allocable to the current $SF_{idx}$, the BS allocates resources to users of $U_{alloc}$ with the power $P_{alloc}$ in step 719 and then terminates this algorithm. By contrast, when $SF_{idx} \leq SF_{MAX}$ and there is a user allocable to the current $SF_{idx}$, the BS selects users having a correlation less than or equal to a threshold with respect to every user of $U_{alloc}$ among the users not allocated the resources, and selects a user having a maximum channel quality in step 705. The user $u_c$ having the lowest correlation and the maximum channel quality can be selected based on Equation (2).

In step 707, the BS checks whether an MPR value of the selected user $u_c$ is greater than zero when the power weight is $P=1$. This is to allocate the resources to the users of the good channel condition by examining the channel condition of the selected user. Although the user of the maximum channel quality is selected in step 705, when the channel condition of the selected user is not so good, the BS can not select a user to be allocated the resource any more to thus raise the system throughput. When the MPR value of the selected user $u_c$ is less than or equal to zero, the BS does not further include users in $U_{alloc}$ and allocates resources to the users of $U_{alloc}$ with the power $P_{alloc}$ in step 719. By contrast, the MPR value of the selected user $u_c$ is greater than zero, the BS stores a user set including the user $u_c$ in $U_{alloc}$ to a temporary use set $U_{new}$ in step 709.

In step 711, the BS calculates a sum of MPR values for the user $u_i$ when the power weight is $P=p_i$ for every user $u_i$ included in the temporary user set $U_{new}$, and stores P corresponding to the largest value of the calculated values to $P_{new}$.

The value stored to $P_{new}$ can be expressed as Equation (11).

$$P_{new} \leftarrow \overset{\text{argmax}}{P} \sum_{(u_i, p_i) \in (U_{new}, P)} f_{MPR}(u_i, p_i) \quad (11)$$

where
$P = \{p_i \mid p_i \text{ is power weighting factor of } u_i \in U_{new}\}$ where $P=\{p_i | p_i$ is power weighting factor of is; $u_i \in U_{new}\}$ (11)

In Equation (11) $p_i$, which is a power weighting factor with respect to the user $u_i$ in the temporary user set $U_{new}$, can be assigned to a random value.

In step 713, the BS calculates a sum of MPR values for every user $u_i$ in the temporary user set $U_{new}$ when the power weight P is $p_i$ belonging to $P_{new}$, and updates $MPR_{new}$ with the calculated value.

$MPR_{new}$ is updated based on Equation (12).

$$MPR_{new} \leftarrow \sum_{(u_i, p_i) \in (U_{new}, P_{new})} f_{MPR}(u_i, p_i) \quad (12)$$

Next, the BS checks whether $MPR_{new} \geq MPR_{alloc}$ in step 715. That is, the BS examines whether the resource allocation to the user $u_c$ increases the total MPR of every user allocated the resource. When $MPR_{new} < MPR_{alloc}$, the BS determines that the resource allocation to the user $u_c$ degrades the system throughput, and thus allocates resources to the users of $U_{alloc}$ with the power $P_{alloc}$ in step 719. By contrast, when $MPR_{new} \geq MPR_{alloc}$, the BS includes the user $u_c$ to the resource allocation user set $U_{alloc}$ by updating the initial values based on Equation (13) in step 717, and returns to step 703 to perform the subsequent steps with respect to the next $SF_{idx}$.

$$U_{alloc} \leftarrow U_{new}; P_{alloc} \leftarrow P_{new}; SF_{idx} \leftarrow SF_{idx}+1;$$
$$W_{alloc} \leftarrow W_{new}; \quad (13)$$

Figure 8:
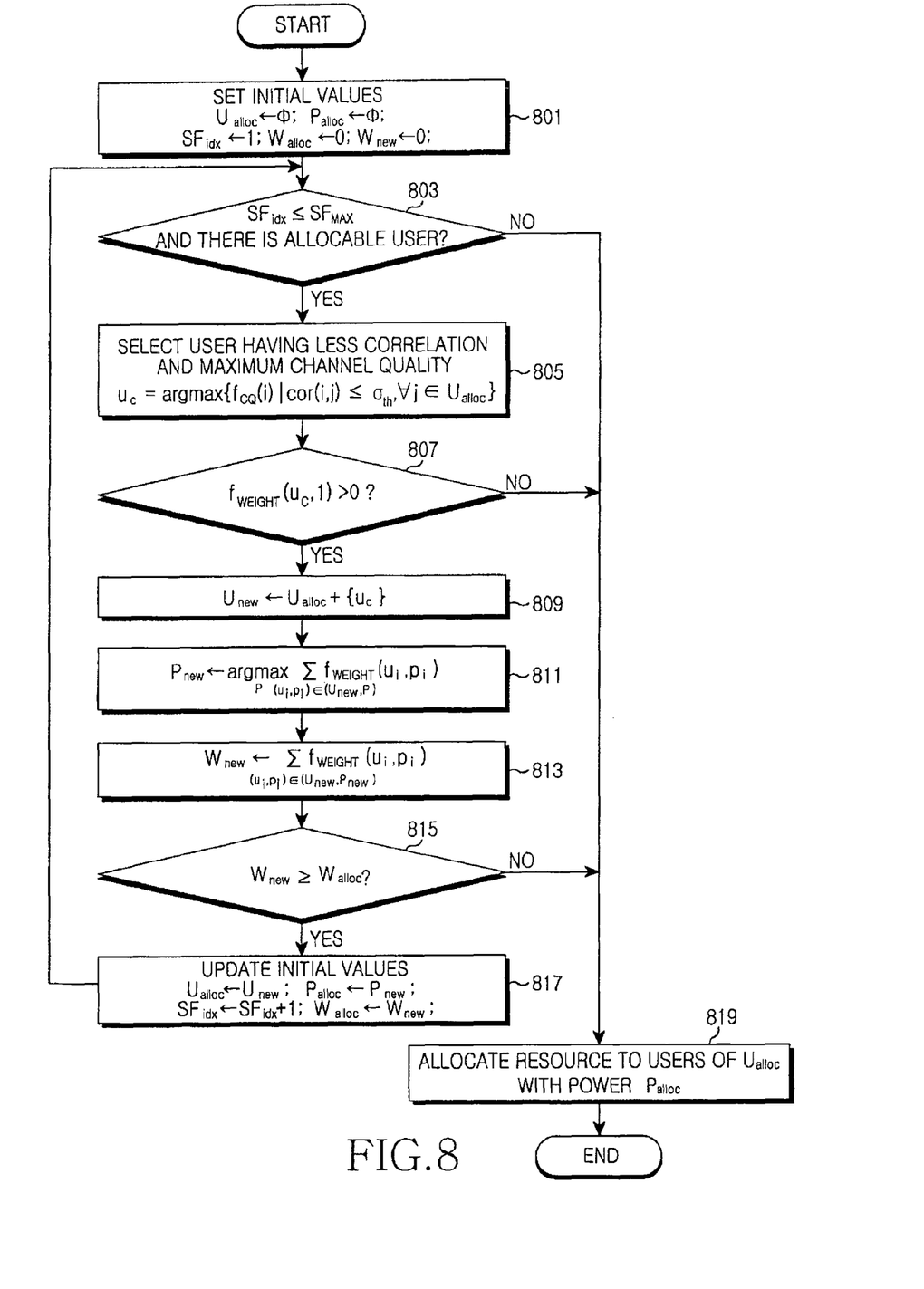
FIG. 8 illustrates a radio resource allocating method of a variable power allocation MaxWeight scheme of BS in an adaptive antenna system according to a fourth embodiment of the present invention.

FIG. 8 illustrates a radio resource allocating method of a variable power allocation MaxWeight scheme of a BS in an adaptive antenna system according to a fourth embodiment of the present invention.

The BS in FIG. 8 sets initial values of resource allocation parameters based on Equation (14) in step 801.

$$U_{alloc} \leftarrow \phi; P_{alloc} \leftarrow \phi; SF_{idx} \leftarrow 1; W_{alloc} \leftarrow 0; W_{new} \leftarrow 0; \quad (14)$$

In Equation (14), $U_{alloc}$ denotes a pre-allocated user set, $P_{alloc}$ denotes a transmit power set of users who maximize MPR when the user set is $U_{alloc}$, and their initial value is set to $\phi$. $SF_{idx}$ denotes a spatial frame index to be allocated currently, and its initial value is set to 1. $W_{alloc}$ denotes a sum of scheduling weight values for users in $U_{alloc}$, when the power eight is $P=p_i$, $W_{new}$ denotes a sum of scheduling weight values for users in $U_{new}$, and their initial value is set to zero. Each element $p_i$ belonging to the set $P_{alloc}$ should satisfy the constraints as in Equation (10).

Next, in step 803, the BS checks whether $SF_{idx} \leq SF_{MAX}$ and whether there is a user allocable to the current $SF_{idx}$. $SF_{MAX}$ denotes a maximum number of allocable spatial frames. When $SF_{idx} > SF_{MAX}$ or there is no user allocable to the current $SF_{idx}$, the BS allocates resources to users of $U_{alloc}$ with the power $P_{alloc}$ in step 819 and then terminates this process. By contrast, when $SF_{idx} \leq SF_{MAX}$ and there is a user allocable to the current $SF_{idx}$, the BS selects users having correlation less than or equal to a threshold with respect to every user of $U_{alloc}$ among the users not allocated the resources, and selects a user having a maximum channel quality in step 805. The user $u_c$ having a lowest correlation and the maximum channel quality can be selected based on Equation (2).

In step 807, the BS checks whether a scheduling weight value of the selected user $u_c$ is greater than zero when the power weight is $P=1$. The scheduling algorithm can employ the proportional fairness algorithm. In this case, the scheduling weight value can be expressed as Equation (6). This is to allocate resources only to users of the good channel condition by examining the channel condition of the selected user. Although the user of the maximum channel quality is selected in step 805, when the channel condition of the selected user is not so good, the BS can raise the system throughput by not selecting a user to be allocated the resource any more. When the scheduling weight value of the selected user $u_c$ is less than or equal to zero, the BS does not further include users in $U_{alloc}$ and allocates resources to the users of $U_{alloc}$ or with the power $P_{alloc}$ in step 819. By contrast, when the scheduling weight value of the selected user $u_c$ is greater than zero, the BS stores a user set including the user $u_c$ in $U_{alloc}$ to a temporary use set $U_{new}$ in step 809.

In step 811, the BS calculates a sum of scheduling weight values for the user $u_i$ when the power weight is $P=p_i$ for every user $u_i$ belonging to the temporary user set $U_{new}$, and stores the largest value of the calculated values to $P_{new}$.

The value stored to $P_{new}$ can be expressed as Equation (15).

$$P_{new} \leftarrow \overset{argmax}{P} \sum_{(u_i, p_i) \in (U_{new}, P)} f_{WEIGHT}(u_i, p_i) \quad (15)$$

where $$P = \{p_i \mid p_i \text{ is power weighting factor of } u_i \in U_{new}\}$$

In Equation (15), $p_i$, which is the power weighting factor with respect to the user $u_i$ belonging to the temporary user set $U_{new}$, can be assigned to a random value.

In step 813, the BS calculates a sum of scheduling weight values for every user $u_i$ of the temporary user set $U_{new}$ when the power weight $P$ is $p_i$ belonging to $P_{new}$, and updates $W_{new}$ with the calculated value.

$W_{new}$ is updated based on Equation (16).

$$W_{new} \leftarrow \sum_{(u_i, p_i) \in (U_{new}, P_{new})} f_{WEIGHT}(u_i, p_i) \quad (16)$$

Next, the BS checks whether $W_{new} \geq W_{alloc}$ in step 815. That is, the BS examines whether the resource allocation to the user $u_c$ increases the total scheduling weight value of every user allocated the resource. When $W_{new} < W_{alloc}$, the BS determines that the resource allocation to the user $u_c$ degrades the system throughput, and allocates resources to the users of $U_{alloc}$ with the power $P_{alloc}$ in step 819. By contrast, when $W_{new} \geq W_{alloc}$, the BS includes the user $u_c$ to the resource allocation user set $U_{alloc}$ by updating the initial values based on Equation (17) in step 817 and returns to step 803 to perform the subsequent steps with respect to the next $SF_{idx}$.

$$U_{alloc} \leftarrow U_{new}; P_{alloc} \leftarrow P_{new}; SF_{idx} \leftarrow SF_{idx} + 1;$$
$$W_{alloc} \leftarrow W_{new}; \quad (17)$$

As set forth above, the apparatus and method of the present invention allocates the radio resources by taking into account the channel quality of the user and the allocated power in the adaptive antenna system, to thereby maximize the system throughput or the scheduler performance.

While the invention has been shown and described with reference to certain preferred embodiments thereof it will be understood by those skilled in the art that various changes in form and details may be made therein without departing from the spirit and scope of the invention as defined by the appended claims.

What is claimed is:

1. A method for simultaneously allocating a radio resource in a frequency-time domain to a plurality of users in an adaptive antenna system, the method comprising:

acquiring channel qualities of a plurality of users for the radio resource;

when a total transmit power of a Base Station (BS) is divided by a number of users allocated to the radio resource, allocating a user with at least one different user to the radio resource based on the channel qualities of the plurality of users for the radio resource and a sum of Modulation order Product code Rate (MPR) values of the users allocated to the radio resource and the user;

checking whether a channel quality of the user is greater than a threshold;

when the channel quality of the user is greater than the threshold, calculating the sum of the MPR values of the users allocated to the radio resource and the user; and transmitting data to the users by using the radio resource and power divided by the users allocated to the radio resource.

2. The method of claim 1, wherein the user has a correlation with the users allocated to the radio resource, below a threshold and a maximum channel quality.

3. The method of claim 1, wherein when a power weight is 1, checking whether the channel quality of the user is greater than the threshold comprises examining whether an MPR value of the user is greater than zero.

4. A method for simultaneously allocating a radio resource in a frequency-time domain to a plurality of users in an adaptive antenna system, the method comprising:

acquiring channel qualities of a plurality of users for the radio resource;

when different transmit powers are given for the plurality of users, allocating a user with at least one different user to the radio resource based on the channel qualities of the plurality of users for the radio resource, a sum of Modulation order Product code Rate (MPR) values of the users pre-allocated to the radio resource and the user, and a transmit power set corresponding to a largest sum of MPR values;

checking whether a channel quality of the user is greater than a threshold;

when the channel quality of the user is greater than the threshold, calculating the sum of the MPR values of the users allocated to the radio resource and the user; and transmitting data to the users by using the radio resource and a different transmit power.

5. The method of claim 4, wherein the user has a correlation below a threshold with the users pre-allocated to the radio resource, and a maximum channel quality.

6. The method of claim 4, wherein when a power weight is 1, checking whether the channel quality of the user is greater than the threshold comprises examining whether an MPR value of the user is greater than zero.

7. A method for simultaneously allocating a radio resource in a frequency-time domain to a plurality of users in an adaptive antenna system, the method comprising:

acquiring channel qualities of a plurality of users for the radio resource;

when a total transmit power of a Base Station (BS) is divided by a number of users allocated to the radio resource, allocating a user with at least one different user to the radio resource based on the channel qualities of the plurality of users for the radio resource and a sum of scheduling weight values of the users allocated to the radio resource and the user;

checking whether a channel quality of the user is greater than a threshold;

when the channel quality of the user is greater than the threshold, calculating the sum of the scheduling weight values of the users allocated to the radio resource and the user; and transmitting data to the users by using the radio resource and power divided by the users allocated to the radio resource.

8. The method of claim 7, wherein the user has a correlation below a threshold with the users allocated to the radio resource, and a maximum channel quality.

9. The method of claim 7, wherein when a power weight is 1, checking whether the channel quality of the user is greater than the threshold comprises examining whether a scheduling weight value of the user is greater than zero.

10. A method for simultaneously allocating a radio resource in a frequency-time domain to a plurality of users in an adaptive antenna system, the method comprising:

acquiring channel qualities of a plurality of users for the radio resource;

when different transmit powers are given for the plurality of users, allocating a user with at least one different user to the radio resource based on the channel qualities of the plurality of users for the radio resource, a sum of scheduling weight values of users allocated to the radio resource and the user, and a transmit power set corresponding to a largest sum of scheduling weight values;

checking whether a channel quality of the user is greater than a threshold;

when the channel quality of the user is greater than the threshold, calculating the sum of scheduling weight values of the users allocated to the radio resource and the user; and transmitting data to the users by using the radio resource and a different transmit power.

11. The method of claim 10, wherein the user has a correlation below a threshold in relation with the users allocated to the radio resource, and a maximum channel quality.

12. The method of claim 10, wherein when a power weight is 1, checking whether the channel quality of the user is greater than the threshold comprises examining whether a scheduling weight value of the user is greater than zero.

13. An apparatus for simultaneously allocating a radio resource in a frequency-time domain to a plurality of user terminals in an adaptive antenna system, the apparatus comprising:

means for acquiring channel qualities of a plurality of users for the radio resource;

means for allocating a user with at least one different user to the radio resource based on the channel qualities of the plurality of users for the radio resource and a sum of Modulation order Product code Rate (MPR) values of the users allocated to the radio resource and the user, when a total transmit power of a Base Station (BS) is divided by a number of users allocated to the radio resource;

means for checking whether a channel quality of the user is greater than a threshold;

means for calculating the sum of the MPR values of the users allocated to the radio resource and the user, when the channel quality of the user is greater than the threshold; and means for transmitting data to the users by using the radio resource and power divided by the users allocated to the radio resource.

14. An apparatus for simultaneously allocating a radio resource in a frequency-time domain to a plurality of user terminals in an adaptive antenna system, the apparatus comprising:

means for acquiring channel qualities of a plurality of users for the radio resource;

means for allocating a user with at least one user to the radio resource based on the channel qualities of the plurality of users for the radio resource, a sum of Modulation order Product code Rate (MPR) values of the users allocated to the radio resource and the user, and a transmit power set corresponding to a largest sum of MPR values, when different transmit powers are given for the plurality of users;

means for checking whether a channel quality of the user is greater than a threshold;

means for calculating the sum of the MPR values of the users allocated to the radio resource and the user, when the channel quality of the user is greater than the threshold; and means for transmitting data to the users by using the radio resource and a different transmit power.

15. An apparatus for simultaneously allocating a radio resource in a frequency-time domain to a plurality of user terminals in an adaptive antenna system, the apparatus comprising:

means for acquiring channel qualities of a plurality of users for the radio resource;

means for allocating a user with at least one different user to the radio resource based on the channel qualities of the plurality of users for the radio resource and a sum of scheduling weight values of the users allocated to the radio resource and the user, when a total transmit power of a Base Station (BS) is divided by a number of users allocated to the radio resource;

means for checking whether a channel quality of the user is greater than a threshold;

means for calculating the sum of the scheduling weight values of the users allocated to the radio resource and the user, when the channel quality of the user is greater than the threshold; and means for transmitting data to the users by using the radio resource and power divided by the users allocated to the radio resource.

16. An apparatus for simultaneously allocating a radio resource in a frequency-time domain to a plurality of user terminals in an adaptive antenna system, the apparatus comprising:

means for acquiring channel qualities of a plurality of users for the radio resource;

means for allocating a user with at least one different user to the radio resource based on the channel qualities of the plurality of users for the radio resource, a sum of scheduling weight values of users allocated to the radio resource and the user, and a transmit power set corresponding to a largest sum of scheduling weight values, when different transmit powers are given for the plurality of users;

means for checking whether a channel quality of the user is greater than a threshold;

means for calculating the sum of the scheduling weight values of the users allocated to the radio resource and the user, when the channel quality of the user is greater than the threshold; and means for transmitting data to the users by using the radio resource and different transmit power.

* * * * *